United States Patent [19]

McCrea et al.

[11] 3,880,618

[45] Apr. 29, 1975

[54] SIMULTANEOUSLY REMOVING SULFUR AND NITROGEN OXIDES FROM GASES

[76] Inventors: Donald H. McCrea, 1532 Tonopah Ave., Pittsburgh, Pa. 15213; John G. Myers, 1600 Cumberland St., Pittsburgh, Pa. 15205

[22] Filed: Mar. 2, 1973

[21] Appl. No.: 337,342

[52] U.S. Cl. .................. 55/68; 423/239; 423/244; 55/73; 55/74
[51] Int. Cl. ............................................ B01d 53/04
[58] Field of Search .......... 55/74, 387, 179, 180, 63, 55/66, 68, 389, 73, 75; 423/239, 244

[56] References Cited
UNITED STATES PATENTS

| | | |
|---|---|---|
| 2,992,884 | 7/1961 | Bienstock et al. .................. 423/244 |
| 3,389,961 | 6/1968 | Sundaresan et al. ............. 423/239 X |
| 3,498,743 | 3/1970 | Kyllonen ............................. 423/239 |
| 3,502,427 | 3/1970 | Johswich ............................... 55/74 |
| 3,524,720 | 8/1970 | Bauer ................................. 423/244 |
| 3,660,040 | 5/1972 | Harding et al. ..................... 423/239 |

*Primary Examiner*—Charles N. Hart
*Assistant Examiner*—Ferris H. Lander
*Attorney, Agent, or Firm*—Roland H. Shubert; Gersten Sadowsky

[57] ABSTRACT

Hot flue gas is cooled to 75–150°C and passed over alkalized alumina or alkali metal carbonate or oxide to simultaneously remove sulfur oxides and nitrogen oxides. Absorbent is regenerated by first heating to 300°–400°C to drive off NO, and then heating to 600°–700°C to drive off absorbed sulfur compounds.

4 Claims, 2 Drawing Figures

SIMULTANEOUSLY REMOVING SULFUR AND NITROGEN OXIDES FROM GASES

This invention relates to the removal of pollutants from waste gases.

Large amounts of sulfur oxides and nitrogen oxides are released to the atmosphere as a result of the combustion of sulfur-containing coal and oil. Other sources of such emissions include water gases, smelter gases, petroleum and tar distillation gases, etc.

It is generally recognized that the release to the atmosphere of large amounts of sulfur oxides is highly undesirable and represents a major air pollution hazard. Further, it has come to be recognized that the release of nitrogen oxides to the atmosphere also constitues a hazard.

Many solid sorbents have been employed to remove sulfur oxides from waste gases. However, little work has been done on the removal of nitrogen oxides.

We have now discovered that certain solids sorbents, at a temperature of about 75°–150°C, will simultaneously remove sulfur oxides and nitrogen oxides from a waste gas, but nitrogen oxides are removed only when sulfur oxides are present in the gas. After absorption, the absorbent is heated to about 300°–400°C to drive off NO which gas can then be treated in the prior art manner. Thereafter, the absorbent is heated to a temperature of about 600°–700°C to drive off and recover absorbed sulfur compounds.

It is therefore an object of the present invention to remove nitrogen oxides from waste gases.

Another object is to simultaneously remove sulfur oxides and nitrogen oxides from waste gases.

Another object is to partially convert $SO_2$ to $SO_3$.

A further object is to regenerate absorbent in a two-stage heating process wherein nitrogen oxides are driven off in one stage and then sulfur compounds are driven off in a higher temperature second stage.

Other objects and advantages will be obvious from the following more detailed description of the invention taken in conjunction with the drawings in which.

Figure 1:
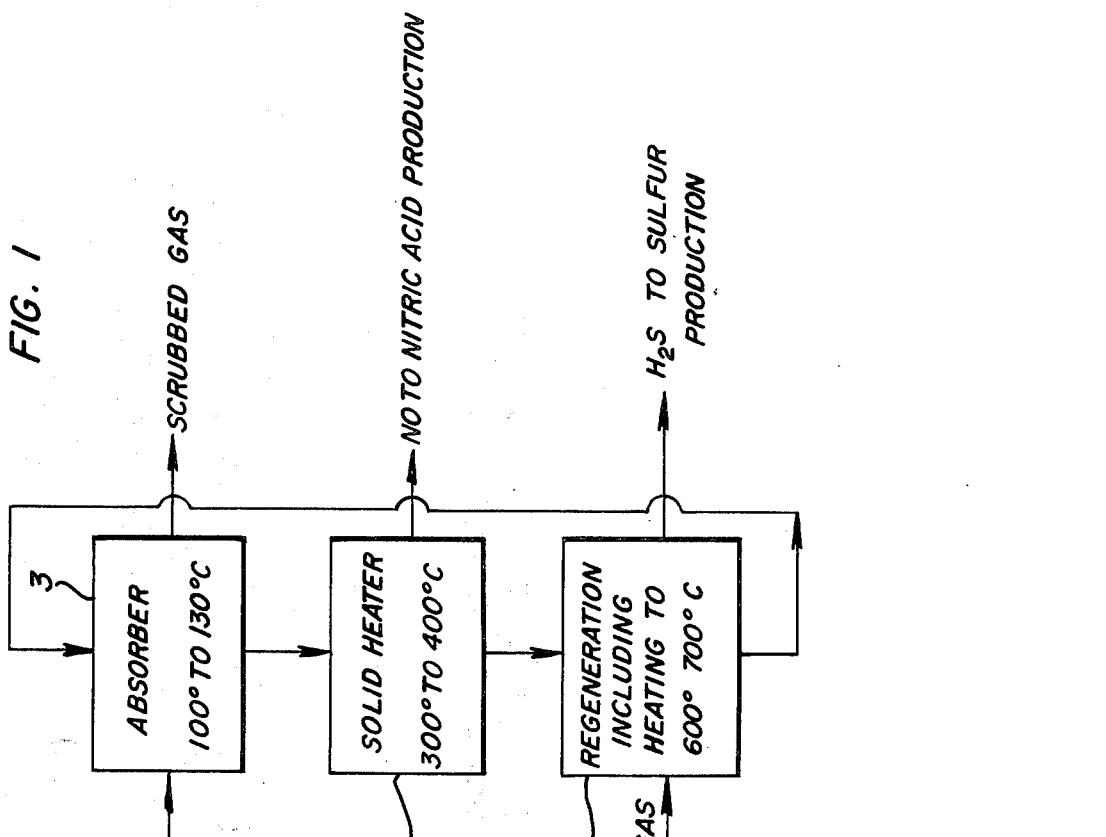
FIG. 1 is a schematic of one embodiment of the present invention.

Referring to FIG. 1, flue gas from, for example, a coal- or oil-burning power plant, normally at a temperature of about 150°C, passes through an electrostatic precipitation step 1 to remove suspended particles such as fly ash. From there, the gas is passed through a cooling step 2 to cool the gas to about 75°–150°, preferably 100°–130°C, by prior art techniques such as water injection.

Thereafter the cooled gas is passed through absorbing step 3 having a bed composed of alkalized alumina, sodium or potassium carbonate or oxide or ores thereof (e.g. trona). Although impractical, oxides or carbonates of other metals in groups 1a of the periodic table can be employed.

The absorbent bed can be of any common type suitable for gas-solid contacting, such as fluidized bed, packed bed, or entrained reactor.

After the absorbent becomes "spent," it is passed through two regenetion steps 4 and 5. In step 4, it is indirectly heated to 300°–400° to drive off NO. A small sweep stream of inert gas e.g. $N_2$ may be used to sweep and collect NO. Gaseous NO is then converted to nitric acid in the prior art manner (e.g. to Ostwald process).

Next, the absorbent is heated at a higher temperature (600°–700°C) in step 5 in the presence of a reducing gas such as hydrogen, reformed natural gas or producer gas, so as to ultimately produce $H_2S$ off-gas and regenerated absorbent. The absorbent is then recycled to step 3. If the absorbent is alkalized alumina, step 5 is generally carried out at 600°–650°C which drives off $H_2S$.

With regard to absorbents of alkali metal carbonates or oxides, a heating temperature of 650°–700°C is employed in step 5 which converts sulfates to sulfides (solid phase). Thereafter the absorbent is cooled to 400°–500°C in the presence of a mixture of $H_2O$ and $CO_2$ (approximately 1:1 mole ratio) which drives off $H_2S$.

The following examples illustrate the advantages of the present invention:

EXAMPLE 1

Alkalized alumina having the following composition:

| Component | Weight, Percent |
|---|---|
| $Al_2O_3$ | 36.8 |
| $Na_2O$ | 21.8 |
| S | 1.0 |
| $CO_2$ | 23.7 |
| $H_2O$ | 12.7 | was activated by exposing it to hydrogen for 10 hours at 650°C. The solid was then placed in a 1-inch diameter by 4-inch deep bed and a simulated flue gas was passed upward through the bed at 1.853 scfh. Temperature of the gas and solid were maintained at 100°C. Composition of the simulated flue gas was:

| Component | Volume, Percent |
|---|---|
| $SO_2$ | 0.2147 (dry basis) |
| NO | 0.1091 (dry basis) |
| $CO_2$ | 12.0 |
| $O_2$ | 5.9 |
| $H_2O$ | 6.7 |
| $N_2$ | 75.1 |

The results of this experiment are shown in Table 1.

Table 1

| Exit gas, $SO_2$ analyses | | Exit gas, $NO_x$ analyses | |
|---|---|---|---|
| Time | Vol. pct. (dry) | Time | Vol. pct. (dry) |
| 0.0 pct to 19 hr 30 min | | 0 hr 45 min | 0.0004 |
| 19 hr 30 min | 0.0019 | 2 hr 5 min | .0007 |
| 20 hr 30 min | 0.0126 | 3 hr 40 min | .0081 |
| 21 hr 30 min | 0.0305 | 6 hr 45 min | .0089 |
| 22 hr 30 min | 0.0545 | 7 hr 45 min | .0117 |
| | | 8 hr 40 min | .0142 |
| | | 10 hr 40 min | .0152 |
| | | 13 hr 45 min | .0133 |
| | | 14 hr 45 min | .0167 |
| | | 15 hr 40 min | .0197 |
| | | 17 hr 40 min | .0200 |
| | | 20 hr 45 min | .0499 |
| | | 21 hr 45 min | .0591 |
| | | 23 hr 5 min | .0763 |

As 80 be seen from Table 1, more than 90 percent of the $SO_2$ in the feed gas was removed for about 21 hours. More than 80 percent of the NO in the feed gas was removed for about 18 hours.

EXAMPLE 2

An experiment, identical to Example 1, was conducted except the gas and solid were maintained at 130°C. The feed gas contained 0.1511 vol. percent $SO_2$ and 0.1003 vol. percent NO. Results of this experiment are shown in Table 2.

Table 2

| $SO_2$ analyses | | $NO_x$ analyses | |
| --- | --- | --- | --- |
| Time | Vol. pct. (dry) | Time | Vol. pct. (dry) |
| 0.0 pct to 20 hr 40 min | | 1 hr 0 min | .0015 |
| 20 hr 40 min | .0201 | 5 hr 0 min | .0093 |
| 21 hr 40 min | .0322 | 7 hr 0 min | .0144 |
| | | 10 hr 0 min | .0181 |
| | | 13 hr 0 min | .0298 |
| | | 17 hr 30 min | .0367 |
| | | 20 hr 30 min | .0545 |

Removal of $SO_2$ was similar to Example 1. NO removal, however, had fallen below 80 percent after 13 hours.

EXAMPLE 3

An experiment, identical to Example 1, was conducted except the gas and solid were maintained at 160°C. The feed gas contained 0.2225 volume percent $SO_2$ and 0.1072 volume percent NO. Results are shown in Table 3.

Table 3

| $SO_2$ analyses | | $NO_x$ analyses | |
| --- | --- | --- | --- |
| Time | Vol. pct. (dry) | Time | Vol. pct. (dry) |
| 0.0 pct to 20 hr 25 min | | 0 hr 45 min | .0386 |
| | | 2 hr 5 min | .0251 |
| | | 3 hr 40 min | .0298 |
| | | 6 hr 45 min | .0362 |
| | | 7 hr 45 min | .0375 |
| | | 10 hr 40 min | .0432 |
| | | 13 hr 45 min | .0451 |
| | | 14 hr 45 min | .0468 |
| | | 17 hr 40 min | .0539 |

Removal of $SO_2$ was similar to Examples 1 and 2. Removal of as much as 80 pct of the NO was never achieved.

EXAMPLE 4

Reagent grade sodium bicarbonate was mixed with water to form a paste. The paste was extruded to form 10 to 14 Tyler mesh granules. The granules were then heated to 134°C in air for 24 hours to convert the sodium bicarbonate to sodium carbonate. An experiment, identical to Example 1, was conducted except the gas and solid were maintained at 130°C. The feed gas contained approximately 0.2 vol pct $SO_2$ and 0.0615 vol pct NO. Results for a 6 hour test are shown in Table 4.

Table 4

| $SO_2$ analyses | | $NO_x$ analyses | |
| --- | --- | --- | --- |
| Time | Vol. pct (dry) | Time | Vol. pct. (dry) |
| 2 hr 20 min | .0112 | 1 hr 10 min | .0210 |

Table 4-Continued

| $SO_2$ analyses | | $NO_x$ analyses | |
| --- | --- | --- | --- |
| Time | Vol. pct (dry) | Time | Vol. pct. (dry) |
| 6 hr 0 min | .0065 | 3 hr 10 min | .0232 |
| | | 4 hr 40 min | .0274 |

As can be seen from Table 4, substantial removal of $SO_2$ and NO was achieved.

EXAMPLE 5

A sample of Trona was crushed, then heated to 130°C in air for 48 hours. After this treatment it contained 2.3 wt pct $NaHCO_3$ and 87.9 wt pct $Na_2CO_3$. An experiment identical to Example 1 was conducted. The feed gas contained 0.2219 vol pct $SO_2$ and 0.1085 vol pct NO. Results of the experiment are tabulated in Table 5.

Table 5

| $SO_2$ analyses | | $NO_x$ analyses | |
| --- | --- | --- | --- |
| Time | Vol. pct. (dry) | Time | Vol. pct. (dry) |
| 0.0 pct to 23 hr 30 min | | 0 hr 45 min | 0.0042 |
| 23 hr 30 min | 0.0089 | 2 hr 5 min | 0.0122 |
| 24 hr 30 min | .0748 | 6 hr 45 min | 0.0161 |
| | | 9 hr 05 min | 0.0125 |
| | | 13 hr 45 min | 0.0195 |
| | | 16 hr 15 min | 0.0186 |
| | | 17 hr 50 min | 0.0286 |
| | | 20 hr 55 min | 0.0449 |

Removal of both $SO_2$ and NO was essentially identical to Example 1.

EXAMPLE 6

After completion of the experiment described in Example 1, the absorbent was heated to 300°C and $N_2$ passed over it at a rate of 0.1 scfh. The $NO_x$ concentration in the exit gas averaged 1.28 vol pct during one hour operation. Analysis by mass spectrometry showed that NO was the only oxide of nitrogen in the gas.

EXAMPLE 7

Trona ore which had been saturated with $SO_2$ and NO and contained 8.4 wt pct as $Na_2SO_4$ was heated to 700°C and contacted with $H_2$ for 60 minutes. During the experiment 37.6 wt pct of the initial sulfur was converted to $Na_2S$, 5.9 wt pct was liberated and 56.5 pct remained as $Na_2SO_4$.

The material was then contacted with a mixture of $CO_2$ and steam, in a mol ratio of approximately 1 to 1 for 150 minutes at 400°C. Of the sulfur remaining after the hydrogen reduction, 33.8 pct was liberated. This result shows that almost all of the sulfur converted to a sulfide by reduction can be removed by contact with steam and $CO_2$.

To remove NO from the gas, the presence of $SO_2$ is most essential, as shown by the following:

EXAMPLE 8

The experiment of Example 5 was repeated except the gas and solid were maintained at 130°C and the simulated flue gas was $SO_2$ free. The feed gas contained 0.1017 vol pct NO. Analyses of the exit gas were taken over a 6 hour period. The average of 8 analyses was 0.0993 vol pct $NO_x$ in the exit gas.

EXAMPLE 9

The experiment of Example 8 was repeated except that the simulated flue gas contained about 0.02 vol pct $SO_2$ and 0.1073 vol pct NO. Analyses of the exit gas were taken over a 7 hour period. The average of 4 analyses was 0.1034 vol pct $NO_x$. Comparison with Example 2 shows that the minimum $SO_2$ concentration needed to absorb NO falls between 0.02 and 0.15 vol pct.

It is believed that a catalytic reaction between NO and $SO_2$ occurs in the presence of the absorbent of the present invention which reaction produces $NO_2$, and that the $NO_2$ is then readily removed by the absorbent. The following example illustrates the ready removal of $NO_2$.

EXAMPLE 10

An experiment identical to Example 1 was conducted except the feed gas composition was.

| Component | Vol. pct. |
|---|---|
| $NO_2$ | 0.5600 (dry basis) |
| $N_2$ | 86.8 |
| $O_2$ | 5.9 |
| $H_2O$ | 6.7 |

Analyses of $NO_x$ in the exit gas during a 6 hour test are tabulated in Table 10.

Table 10

| Time | $NO_x$, Vol pct. (dry) |
|---|---|
| 2 hr 45 min | 0.2444 |
| 4 hr 45 min | 0.2796 |
| 5 hr 45 min | 0.2694 |

As can be seen from Table 10, substantial amounts of $NO_x$ are removed by the absorbent.

In addition to formation of $NO_2$, $SO_3$ is another intermediate formed during the process. Tests have shown that reducing the gas-absorbent contact time produces an exit gas having an increased $SO_3$ content. Since it is well-known in the art that the presence of $SO_3$ in a flue gas improves electrostatic percipitator performance, the alternative embodiment shown in FIG. 2 may be employed in the practice of the present invention.

Figure 2:
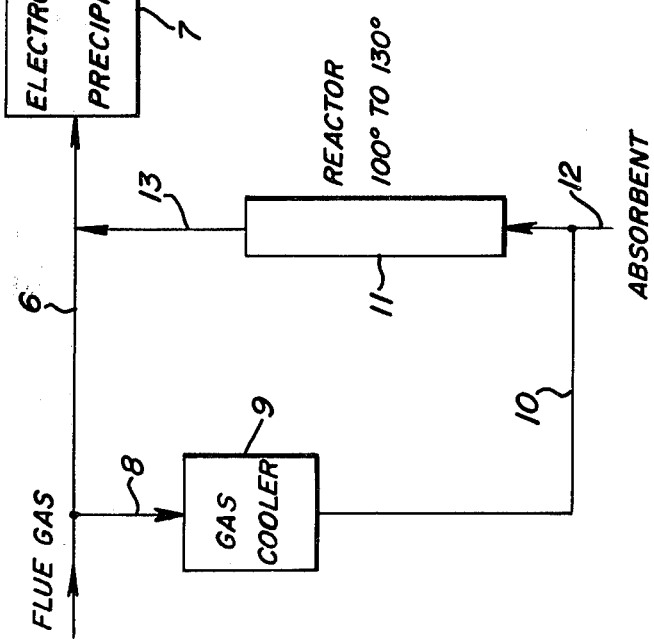
FIG. 2 represents an alternative embodiment.

Referring to FIG. 2, flue gas from, for example, a coal-burning power plant is conveyed by conduit 6 to electrostatic precipatator 7. A minor portion of the gas in conduit 6 is tapped off by conduit 8 and passed through gas cooler 9 to reduce the temperature to about 100°–130°C. From there, the gas is passed via conduit 10 to a tubular reactor 11. Absorbent is injected through conduit 12 into the reactor. The absorbent is then carried with the gas through conduit 13 back into main conduit 6, and is finally collected with other particulates in electrostatic precipitator 7. The quantity of flue gas treated with absorbent is selected so that the gas entering the electrostatic precipitator contains 10 to 15 ppm $SO_3$. Typically, 1 – 2 vol % of the total flue gas is treated in this manner.

What is claimed is:

1. A process for removing nitrogen oxides, selected from the group consisting of NO and $NO_2$, from a gas which contains at least 200 ppm of sulfur dioxide which comprises contacting said gas at a temperature of about 75°–150°C. with a solid absorbent selected from the group consisting of alkalized alumina, sodium, and potassium carbonate or oxide, recovering nitrogen oxides from said absorbent by heating it to a temperature of 300°–400°C and thereafter regenerating said absorbent to a temperature of 600°–700°C in the presence of a reducing gas whereby sulfur compounds are removed from the absorbent.

2. The process of claim 1 wherein said contacting temperature is about 100° – 130°C.

3. The process of claim 1 wherein said gas is produced by burning coal or oil.

4. The process of claim 3 wherein said contacting temperature is about 100° – 130°C.

* * * * *